(12) United States Patent
Knittel et al.

(10) Patent No.: US 7,385,905 B2
(45) Date of Patent: Jun. 10, 2008

(54) APPARATUS FOR READING FROM AND/OR WRITING TO OPTICAL RECORDING MEDIA

(75) Inventors: Joachim Knittel, Tuttlingen (DE); Hartmut Richter, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 265 days.

(21) Appl. No.: 10/541,761

(22) PCT Filed: Dec. 22, 2003

(86) PCT No.: PCT/EP03/14735

§ 371 (c)(1),
(2), (4) Date: May 4, 2006

(87) PCT Pub. No.: WO2004/064049

PCT Pub. Date: Jul. 29, 2004

(65) Prior Publication Data

US 2006/0256693 A1    Nov. 16, 2006

(30) Foreign Application Priority Data

Jan. 10, 2003    (DE)    ................ 103 00 810

(51) Int. Cl.
*G11B 7/00*    (2006.01)

(52) U.S. Cl. ............................ 369/112.02; 369/112.03; 369/112.16; 369/44.32

(58) Field of Classification Search ...................... None
See application file for complete search history.

(56) References Cited

U.S. PATENT DOCUMENTS

| | | | |
|---|---|---|---|
| 5,621,717 A | 4/1997 | Finkelstein et al. | |
| 5,907,530 A | 5/1999 | Cho et al. | |
| 5,909,422 A | 6/1999 | Kamatani | |
| 6,172,957 B1 | 1/2001 | Ogasawara | |
| 6,751,175 B1 * | 6/2004 | Maeda et al. | ............. 369/53.19 |
| 2002/0036958 A1 | 3/2002 | Wada et al. | |
| 2003/0035350 A1 | 2/2003 | Ogasawara et al. | |
| 2006/0056276 A1 * | 3/2006 | Shimano et al. | ....... 369/112.02 |

OTHER PUBLICATIONS

Search report dated Jul. 19, 2004.

\* cited by examiner

*Primary Examiner*—Muhammad N. Edun
(74) *Attorney, Agent, or Firm*—Joseph J. Laks; Robert B. Levy; Jorge Tony Villabon

(57) ABSTRACT

When an optical recording medium having a plurality of data layers is being read from and/or written to, the input beam experiences an aberration, inter alia in the top layers of the data layers. In order, nevertheless, to achieve a high data density, a device for correcting the spherical aberration is located in the beam path of the input beam. In the case of the use of an optical diode in which the input beam and the reflected beam have directions of polarization perpendicular to one another, such a device is expensive to implement and associated with a reduced optical efficiency. It is an object of the invention to propose an apparatus for reading from and/or writing to optical recording media, in the case of which a high optical efficiency and balancing of the spherical aberration are achieved with low outlay. For this purpose, the device for correcting the spherical aberration is set up such that the reflected beam traverses it uninfluenced, whereby means for correcting the imaging of the reflected beam onto at least one detector unit are provided in the further beam path.

7 Claims, 1 Drawing Sheet

APPARATUS FOR READING FROM AND/OR WRITING TO OPTICAL RECORDING MEDIA

This application claims the benefit, under 35 U.S.C. § 365 of International Application PCT/EP03/14735, filed Dec. 22, 2003, which was published in accordance with PCT Article 21(2) on Jul. 29, 2004 in English and which claims the benefit of German patent application No. 10300810.1, filed Jan. 10, 2003.

The invention relates to an apparatus for reading from and/or writing to optical recording media, having a device for correcting optical aberration.

Such apparatuses use a read or a write beam, denoted below as input beam, that is emitted by a radiation source, usually a laser diode, in order to read from or to write to a data layer of the optical recording medium. The beam emitted by the radiation source is firstly collimated by a collimator lens and then traverses a beam splitter before it is focused onto the data layer by an objective lens that can move perpendicular to the data layer of the recording medium. A data beam running counter to the input beam is produced by the partial reflection of the input beam at a structure of the data layer representing the data and arranged in the form of tracks. This data beam is collimated by the objective lens and deflected by the beam splitter in the direction of a detector unit onto which it is focused by a focusing lens. The detector unit has one or more detectors for detecting the data beam. It is customary to use photodiodes as detectors. The read-out data are, on the one hand, recovered (data signal) from the signals of the detectors, but on the other hand they permit monitoring of the position of the input beam relative to the data track (track error signal), as well as modeling of the position of the focus of the input beam relative to the data layer (focus error signal).

Recording media that are read from and/or read to such apparatuses are known, for example, by the names of compact disc audio (CD), compact disc read-only memory (CD-ROM), compact disc recordable (CD-R) or digital versatile disc (DVD).

In order to raise the data density on the recording medium, on the one hand input beams of shorter wavelength are used, while on the other hand a plurality of data layers are arranged one above another. However, when a plurality of data layers are used the problem arises that the input beam experiences an aberration in the cover layers covering the data layers, typically a spherical aberration. The aberration of the input beam leads to a noticeable expansion of the focal spot, particularly in the data layers situated undermost, and this runs counter to the actual aim of obtaining a higher data density. Consequently, there are located in the beam path devices for correcting the spherical aberration which are used to undertake the correction of the wave front of the input beam that balances the spherical aberration. The device for correcting the spherical aberration is normally a liquid crystal element (LC element) that is introduced into the beam path upstream of the objective lens. Typical LC elements, which are not too complex, permit the wave front to be influenced and thus the spherical aberration to be corrected only in one direction of polarization. Thus, if both the outgoing and the returning beam are to be influenced, the direction of polarization of the two beams must be the same.

U.S. Pat. No. 5,909,422 describes a reading apparatus in the case of which a light beam is directed onto a multilayer recording medium by means of a partially reflecting beam splitter. The beam is focused onto the respective data layer by means of an appropriately driven LC element and a lens. The returning data beam traverses the lens and the LC element and is directed onto a detector by means of a further focusing lens. Since no element influencing polarization is used in the proposed arrangement, the outgoing input beam and the returning data beam have the same direction of polarization, that is to say both are influenced by the LC element.

However, normally apparatuses for reading from and/or writing to optical recording media uses so called "optical diode", that is to say, a combination of a polarization beam splitter and a downstream quarter wave plate or another element influencing polarization. The laser diode emits a linearly polarized input beam that traverses the polarization beam splitter largely without attenuation. Upon traversing the quarter wave plate, the input beam is converted by a phase shift into a circularly polarized beam. The data beam reflected by one of the data layers traverses the quarter wave plate in turn, a further phase shift again producing from the circularly polarized data beam a linearly polarized beam whose direction of polarization is, however, rotated by 90° with reference to that of the incoming input beam. Using the polarization beam splitter the data beam is coupled out perpendicular to the input beam and directed onto the detector unit. The use of an "optical diode" has the advantage that the optical efficiency, that is to say the ratio of the light impinging on the detector unit to the light emitted by the laser diode, is greater by a factor of four than in the case of the use of a partially reflecting beam splitter in the case of which the input beam and data beam have substantially the same direction of polarization.

In the case of the use of an "optical diode", the outgoing input beam and the returning data beam have directions of polarization perpendicular to one another. If, however, the two beams are to be influenced, there is a need for two crossed LC elements. Since these are arranged together with the focusing lens and the quarter wave plate on an actuator which, upon adjustment, brings the focus onto the various data layers, powerful adjusting mechanisms are required for the focus of the beam to remain in the data layer which, because of mechanical insufficiencies of the recording medium or of the drive of the recording medium, changes by an order of magnitude that is greater by a multiple than the depth of focus. In addition, LC elements have the disadvantage that their transmission losses are of the order of magnitude of 10-20%. If both the outgoing input beam and the returning data beam are influenced by the LC element, losses of the order of magnitude of up to 40% result. If, on the other hand, only the wave front of the outgoing input beam is influenced, substantial aberrations occur on the detector unit.

The invention is based on the problem of providing an apparatus for reading from and/or writing to optical recording media, in the case of which a high optical efficiency, a rapid adjustability of the focal plane and an automatic balancing of the spherical aberration are achieved in conjunction with low outlay.

This problem is solved by virtue of the fact that in the case of an apparatus for reading from and/or writing to optical recording media and which uses an optical diode, the device for correcting the spherical aberration is set up such that the reflected data beam traverses it uninfluenced, and in that the means for correcting the imaging of the data beam onto at least one detector unit are provided in the further beam path.

The invention is therefore based on the consideration that the returning data beam is affected by a spherical aberration, and this prevents the data beam from being imaged onto the detector unit without error. Such aberrations can be eliminated by providing means for correcting the imaging. The arrangement of the correction means in the coupled-out data beam has, moreover, the advantage that there is no need for further elements to be fitted on the actuator, as a result of which the requirements based on the adjusting mechanisms are reduced.

The device for correcting the spherical aberration consists of a liquid crystal element that influences the wave front in one direction of polarization in order to balance the spherical aberration, the quarter-wave plate being arranged downstream of the polarization beam splitter in the direction of the laser beam.

The laser diode emits a polarized input beam that undergoes in the liquid crystal element a correction of the wave front with the aid of which the aberration occurring in the recording medium is just compensated. Since the beam is polarized, the liquid crystal element also needs to operate only in one direction of polarization. This is relatively easy to accomplish. Such an element is also not very heavy. Subsequently, the wave front-corrected light beam runs through the quarter wave plate and is converted into a circularly polarized beam. This beam is focused with the aid of an objective lens onto the respective data layer where it is reflected to a different degree in accordance with the spatial structure (pits) present there. The reflected beam firstly traverses the objective lens and is converted again, by the quarter wave plate, into a linearly polarized beam whose direction of polarization is, however, rotated by 90° with reference to that of the incoming beam. The reflected beam is therefore not influenced by the liquid crystal element. With the aid of the polarization beam splitter, this beam is coupled out at a right angle relative to the incoming beam and traverses a system for correcting the image. There are a variety of possibilities for this.

In accordance with a first aspect of the invention, one or more beam splitters are located in the beam path of the coupled-out data beam, the individual partial beams being directed onto in each case one dedicated detector. Each of the detectors is optimized in this case for a specific data layer. The correction of the imaging is performed by the different distances of the various detectors from the focusing lens. The data signal and the track error signal are determined in this case from the sum of the signals of the individual detectors, and so the efficiency of the system decreases only slightly, while the focus error signal is determined only from the signal of an individual detector, assigned to the respective data layer.

In accordance with a second aspect of the invention, there is provided in the coupled-out data beam a diffractive lens, for example a hologram, that deflects parts of the data beam onto further detectors of which, in turn, each is optimized for a specific data layer. The correction of the imaging is performed here by the different path lengths which the parts of the data beam cover from the diffractive lens up to the respective detector. In this case, as well, the data signal and the track error signal are determined from the signals of all the detectors, while the focus error signal is determined only from the signal of an individual detector assigned to the respective data layer. Owing to the short spacing of the individual detectors, the detectors can be arranged on a common chip, and this greatly simplifies the summing of the signals.

In accordance with a further aspect of the invention, the correction means are a further LC element that constitutes a spherical or aspheric lens whose focus can be varied continuously or in discrete steps. In this case, an individual detector unit suffices for determining the signals, since the imaging can always be corrected for this detector unit. Though the additional LC element reduces the optical efficiency of the system, it has the advantage that the optical intensity is not reduced on the recording medium, as is the case with the use of crossed LC elements. This is important, in particular, for writing to optical recording media.

To gain a better understanding of the invention, the latter is to be explained in more detail below with the aid of three exemplary embodiments. In the drawing.

Figure 1:
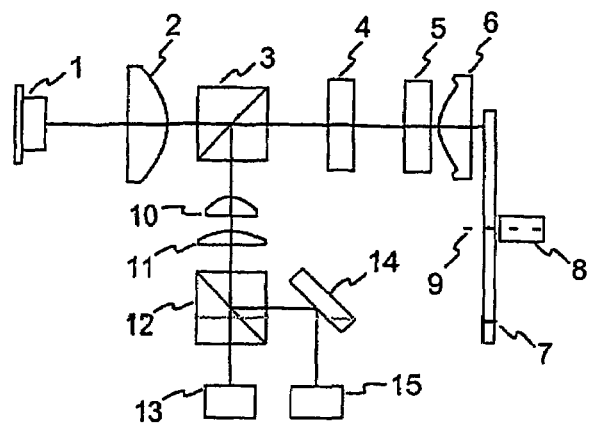
FIG. 1 shows an illustration of the principle of a first system.
Figure 2:
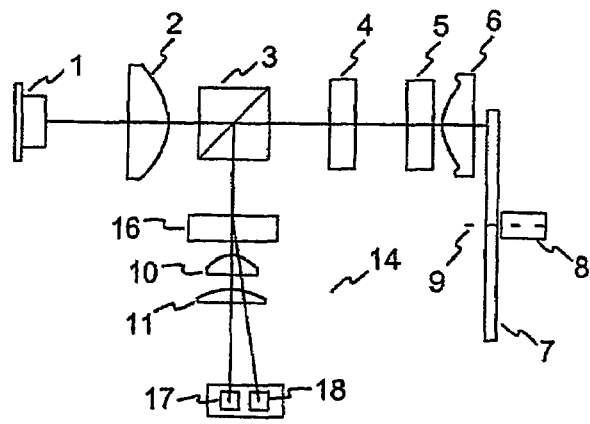
FIG. 2 shows an illustration of the principle of a second system.
Figure 3:
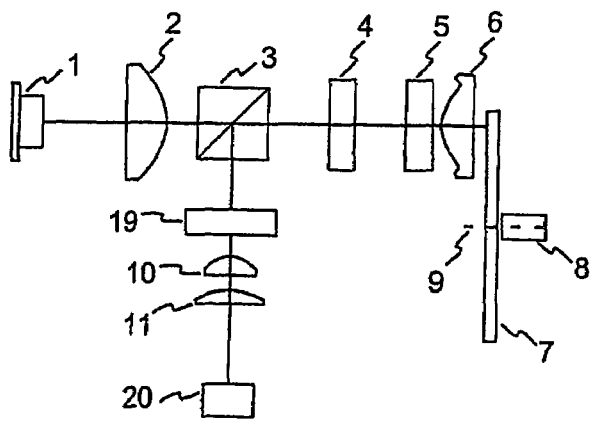
FIG. 3 shows an illustration of the principle of a third system.

All the systems have a radiation source 1, preferably a laser diode, that emits a linearly polarized light beam. The emitted light is parallelized by a collimator lens 2 and passes through a polarization beam splitter 3 that passes light polarized in a first direction unimpeded and deflects light polarized in a direction perpendicular to the first direction by 90°. The polarization beam splitter 3 is aligned such that the beam coming from the radiation source 1 is not deflected. The next step is that this beam traverses an LC element 4 that can be driven electrically and is capable, because of its design, of manipulating the wave front of the incoming beam. Such devices are known and are described, for example, in U.S. Pat. No. 6,182,957 or in U.S. Pat. No. 5,909,422. In the present case, the LC element 4 is designed such that it responds to the beam only in one direction of polarization, and this substantially simplifies its design and the driving process.

The LC element 4 is followed by a quarter wave plate 5 with the aid of which the incoming, linearly polarized beam is converted into a circularly polarized beam. In this form, the beam enters an objective lens 6 that focuses the beam onto in each case one of a plurality of data layers, situated one above another, of a disc-shaped recording medium 7 that is put into a rapid rotating movement about its axis of rotation 9 by means of a rotary drive 8. The point of impingement of the beam is displaced slowly in a radial fashion relative to the axis of rotation 9 over the surface of the disc such that the data layers are scanned by the beam on a spiral track.

The objective lens has a high numerical aperture that is of the order of magnitude of 0.5 and above. Consequently, although a high light throughput is achieved, there also is a large aberration in the cover layers. In order to address the problems arising in this case, the LC element is used to carry out a wave front correction.

Not illustrated in more detail is an actuator with the aid of which the objective lens 6 and the LC element 4 can be moved jointly perpendicular to the recording medium 7. Two tasks are thereby fulfilled: firstly, the focus can be moved from one data layer to the other. Secondly, a correction of focus is performed: the data layer does not move exactly in a plane perpendicular to the beam, because, on the one hand, the data layers are not absolutely plane, and, on the other hand, the recording medium itself can be tilted with reference to its axis of rotation and thus with reference to the beam axis. This has the consequence that the current region, about to be read out, of the data layer moves to and fro along the beam axis. The focus has to follow that.

At the geometric data structure of the data layer in the recording medium, represented by the sequence of pits, the light is reflected to a varying degree such that the sequence of the optical intensity of the reflected data beam images the data structure. The returning data beam firstly traverses the objective lens 6 and then the quarter wave plate 5, as a result of which the circularly polarized beam is polarized linearly, in turn, specifically perpendicular to the direction of polarization of the incoming beam. In the polarization beam splitter 3, the returning beam is therefore deflected laterally and guided to a detection system on to which it is imaged with the aid of a focusing lens 10 and a cylindrical lens 11.

The returning beam is provided with a spherical aberration that is not compensated by the LC element 4, since the direction of polarization is perpendicular to the direction of action of the LC element 4. In order to avoid aberrations when the returning beam is imaged onto the detection system, a system for correcting the imaging is additionally provided.

The system for correcting the imaging consists in accordance with system 1 (FIG. 1) of a further beam splitter 12. The latter splits the beam into at least two partial beams in accordance with the number of the data layers in the recording medium. Further beam splitters are required if more than two data layers are present. Each partial beam is directed to a detector 13, 15. The sum of the signals from the detectors 13, 15 is the data signal. In addition, each beam path is optimized for in each case one of the data layers by the use of different path lengths that the respective partial beam must cover up to the detector 13, 15. This means that imaging which is largely free from error is performed onto in each case one of the detectors 13, 15. The signals of this detector 13, 15 can be used to obtain the track error signal and the focus error signal. In principle, a system shown for one data layer is transferred to a recording medium having a plurality of data layers by assigning each data layer a detector.

The second system comprises a diffraction lens 16. The diffraction lens 16 can be, for example, a holographic optical element in the case of which the beams that are close to the beam axis, and those that are further away therefrom, are directed onto different detectors 17, 18. In this case, as well, each detector is optimized by the use of different path lengths for one of the data layers of the recording medium. The data signal is thus obtained, once again, from the sum of the signals of the detectors 17, 18, while the track error signal and the focus error signal are obtained from the signals of the detectors 17, 18 optimized for the respective data layer.

System 3 provides an additional LC element 19 that compensates the aberration of the data beam. In addition, the LC element 19 preferably has an electrode arrangement that permits the LC element 19 to function as a spherical or aspheric lens of variable focal length. The data beam can be imaged in a largely error free fashion on an individual detector 20 by adapting the focal length.

Although the additional LC element 19 reduces the optical efficiency of the system, the arrangement has the advantage at the same time that the optical intensity on the recording medium is not reduced, as is the case with the prior art. This is important, in particular, for writing to the recording medium.

The invention claimed is:

1. An apparatus for reading from and/or writing to an optical recording medium having at least two data layers situated one above another, having a device for correcting an aberration that is experienced in the recording medium by an input beam used for reading from and/or writing to, the input beam and a beam reflected at the recording medium having directions of polarization that are essentially perpendicular to one another during traversal of the device for correcting the aberration, the device for correcting the aberration is being set up such that the reflected beam traverses it uninfluenced, the reflected beam being focused onto at least one detector wherein means compensating for the aberration experienced by the reflected beam are provided in the further beam path.

2. The apparatus as claimed in claim 1, wherein the device for correcting the spherical aberration consists of a liquid crystal element that influences the wave front in only one direction of polarization in order to balance the spherical aberration, a quarter-wave plate being arranged downstream of the device in the direction of the input beam.

3. The device as claimed in claim 1, wherein correction means provided in the further beam path are one or more beam splitters that are traversed by the reflected beam and split the latter into two or more partial beams, the individual partial beams being directed onto one detector each which are arranged such that the optical path length from the optical recording medium to a detector is optimized for in each case one of the data layers.

4. The apparatus as claimed in claim 3, wherein the data signal is obtained from the sum of the signals of the detectors, and in that a focus error signal and/or a track error signal are/is obtained from the signals of that detector for which the optical path length from the optical recording medium to the detector is optimized for the respective data layer.

5. The apparatus as claimed in claim 1, wherein the correction means provided in the further beam path is a diffractive lens that is traversed by the reflected beam and splits the latter into two or more partial beams, the individual partial beams being directed onto one detector each which are arranged such that the optical path length from the optical recording medium to a detector is optimized for in each case one of the data layers.

6. The apparatus as claimed in claim 1, wherein the correction means provided in the further beam path is a device for correcting the wave front that balances the aberration.

7. The apparatus as claimed in claim 6, wherein the device for correcting the wave front is a liquid crystal element.

* * * * *